(No Model.)

D. C. SMITH.
COUPLING FOR ROUND BELTING.

No. 342,850. Patented June 1, 1886.

Witnesses:
Alex. Selkirk
Charles Seekirk

Daniel C. Smith
Inventor.

UNITED STATES PATENT OFFICE.

DANIEL C. SMITH, OF ALBANY, NEW YORK.

COUPLING FOR ROUND BELTING.

SPECIFICATION forming part of Letters Patent No. 342,850, dated June 1, 1886.

Application filed September 28, 1885. Serial No. 178,455. (No model.)

*To all whom it may concern:*

Be it known that I, DANIEL C. SMITH, a citizen of the United States, residing at the city of Albany, county of Albany, and State of New York, have invented a new and useful Improvement in Couplings for Connecting the Two Ends of Round Belts on Sewing-Machines, of which the following is a specification.

My invention relates to the construction of a metallic coupling to unite the two ends of round belts.

I construct my coupling in three pieces—viz., two sockets and one central connection, said connection having a ball on each end. The sockets are made with an Archimedean screw in one end, to admit of the belts being screwed therein, and in the other end is made a ball-socket, made to fit the ball on the end of the connection, so that when the connection is adjusted in the socket their ends are made to fit the balls. Both sockets are connected, having two ball-socket joints equidistant from the center of the connection, while the other end of each socket is in proper line to have one end of the belt screwed into them, making an endless belt, having a metallic connection with two ball-socket joints that will yield to conform to the arc of any circle described by the periphery of the pulleys on which it runs. I attain these objects by the mechanism represented in the accompanying drawings, in which—

Figure 1:
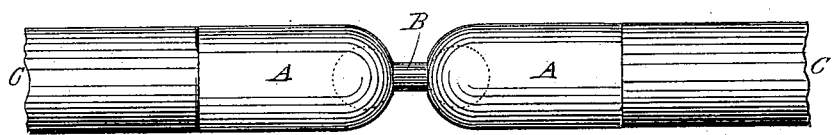

Figure 1 exhibits the coupling and its several parts—viz., sockets A A, their connection B, adjusted in one end, and a section of belt, C C, screwed in the other end of them—exhibiting the coupling as it appears attached to the belt when ready to be used.

Figure 2:
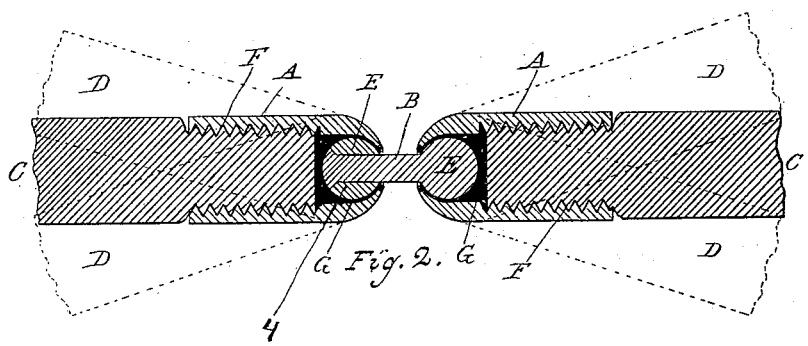

Fig. 2 exhibits the coupling with its top half laid off, for the purpose of showing clearly the relation of its several parts to each other—viz., sockets A A, connection B, its balls E E, belt C C, screw-thread F F, and dotted lines D D. One of the balls on connection B is made separate from the connection, and is attached thereto by a screw-thread or riveted. The connection B is adjusted in the sockets A A by detaching the ball E (indicated by the numeral 4) from its connection. Then the connection B can be placed inside of both sockets A A, and the adjustable ball returned to its former place, and the coupling is completed, ready to receive the belt.

I will describe the operation of my belt-coupling as follows, viz: The belt is placed around the shaft of the pulleys it is to be used on, and then its ends screwed into the ends of sockets A A by means of their screw-threads F F. The belt is then run onto the pulleys, and as the pulleys revolve and the coupling passes around the pulleys the sockets A A yield to conform to the arc of any circle required by the pulleys, by means of the balls E E, as is shown by the dotted lines D D in Fig. 2.

Having described my invention, what I claim, and desire to secure by Letters Patent, is—

In a coupling for round belting, the combination, with the end-sockets, of the connecting-bar and socket-balls, one of which is removable, substantially as set forth.

DANIEL C. SMITH.

Witnesses:
NETTIE P. BELDEN,
JULIA C. BUTTS.